United States Patent [19]

Hamilton et al.

[11] Patent Number: 4,957,177

[45] Date of Patent: Sep. 18, 1990

[54] ENCLOSED MOMENT-INSENSITIVE LOAD CELL

[75] Inventors: Michael N. Hamilton, Columbus; Edwin J. Stolz, Westerville, both of Ohio

[73] Assignee: Toledo Scale Corporation, Worthington, Ohio

[21] Appl. No.: 391,461

[22] Filed: Aug. 9, 1989

[51] Int. Cl.[5] ........................ G01G 3/14; G01G 21/02; G01L 25/00

[52] U.S. Cl. .................................... 177/211; 177/179; 73/862.65

[58] Field of Search ............................... 177/211, 179; 73/862.65

[56] References Cited

U.S. PATENT DOCUMENTS

| | | | |
|---|---|---|---|
| Re. 32,746 | 9/1988 | Nelson et al. | 73/779 |
| 4,196,784 | 4/1980 | Suzuki et al. | 177/211 |
| 4,208,905 | 6/1980 | Spoor | 73/862.65 |

Primary Examiner—George H. Miller, Jr.

[57] ABSTRACT

A dual beam moment-insensitive load cell is hermetically sealed in a bellows or partial-bellows enclosure. The enclosure may have convolutions over substantially its entire length which permits it to flex easily in the direction of load cell bending. The enclosure is made resistant to elastic buckling under torsional forces produced by off-center loading of the load cell by one or more rods spaced circumferentially about the enclosure and connecting together a number of the convolutions after the convolutions are aligned. The alignment and torsional stiffening resist elastic buckling of the enclosure and resulting error in the output of the load cell. Another form of enclosure has one or more convolutions at each end and joined by a relatively straight, non-convoluted wall which itself is resistant to torsional elastic buckling. The resistance of the wall to torsional elastic buckling can be increased by increasing its thickness uniformly or by applying stiffener rods thereto.

15 Claims, 2 Drawing Sheets

ENCLOSED MOMENT-INSENSITIVE LOAD CELL

BACKGROUND OF THE INVENTION

This invention relates to load cells and more particularly to a moment-insensitive load cell enclosed or hermetically sealed by means of an expansible convoluted enclosure such as a bellows.

A single or multiple beam load cell may be compensated for the effects of torsional forces produced by off-center applications of load by, for example, the methods taught in U.S. Pat. Nos. 4,380,175 and 4,453,609 issued to Neil C. Griffen and assigned to the Assignee of the present invention. A load cell compensated for such off-center loading effects is known as a "Moment-Insensitive Load Cell" (hereinafter MILC). The methods of compensation taught by Griffen makes it desirable that the errors due to off-center loading be linear as the point of off-center load application is moved transversely from one to the other side of the load cell.

Recently, it has become desirable for some applications to hermetically seal the central portions of the MILC bearing the strain gages or other force transducers. A bellows has been found suitable for the purpose, enclosing the load cell so that its convolutions encircle the longitudinal axis of the load cell beam or beams. A narrower neck portion at each end of the bellows is welded to the load cell. With this orientation, the bellows, because of the convolutions, is weak in the direction of load cell bending or flexure and has no significant effect on the load cell output.

More recently, however, it has been discovered that such hermetically sealed load cells have been very difficult to compensate for transverse off-center loading.

SUMMARY OF THE INVENTION

According to the present invention, it has been discovered that the source of the problem in compensating a bellows-enclosed load cell is deformation in the form of elastic buckling of the bellows under application of a torsional load. Such deformation produces a force vector perpendicular to the longitudinal axis of the enclosure/load cell assembly. This force vector is transmitted to the load cell and interpreted thereby as part of the force to be measured. A solution has been found involving increasing the resistance of the bellows to torsional deformation such as buckling under torsional loads while maintaining its flexibility as to pure bending loads.

A load cell embodying the present invention includes at least one beam having a central longitudinal axis and force transducers mounted on the beam. Enclosure means is provided to enclose the portion of the beam bearing the transducers. The enclosure means has a first end and a second end rigidly attached to the beam, and is flexible to loads applied along the longitudinal axis and relatively resistant to torsional deformation resulting from loads applied transversely of the longitudinal axis.

According to one embodiment of the invention, the enclosure means has one or more convolutions adjacent each end joined by a continuous non-convoluted wall portion. The non-convoluted wall portion is resistant to torsional deformation while the end convolutions provide flexibility to forces applied along the longitudinal axis of the beam.

According to another embodiment of the invention the enclosure means is a conventional bellows having a series of convolutions throughout its length. Means are provided to connect the radial ends of a number of adjacent convolutions rigidly together at one or more points on the circumference of the enclosure. The connecting means may take the form of a relatively rigid rod soldered or otherwise suitably attached to the convolutions.

DESCRIPTION OF THE PREFERRED EMBODIMENTS

Figure 1:
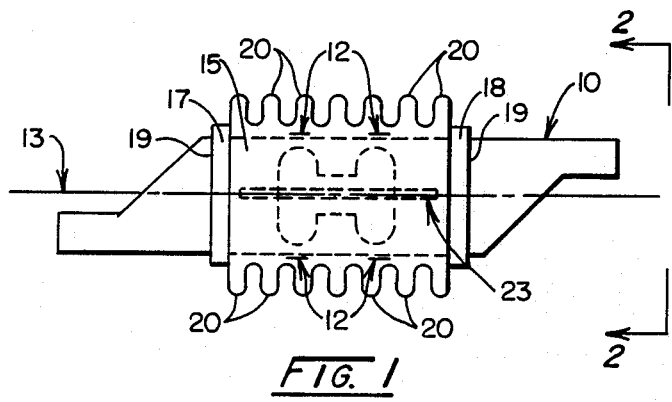
FIG. 1 is a side elevational view of an enclosed load cell embodying the present invention.
Figure 2:
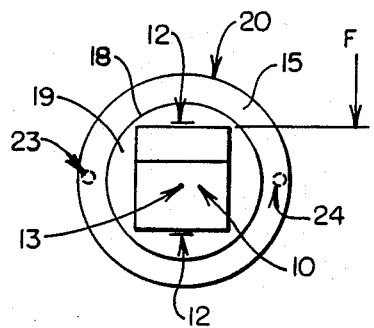
FIG. 2 is an end view of the load cell in the direction of the arrows 2—2 of FIG. 1.
Figure 3:
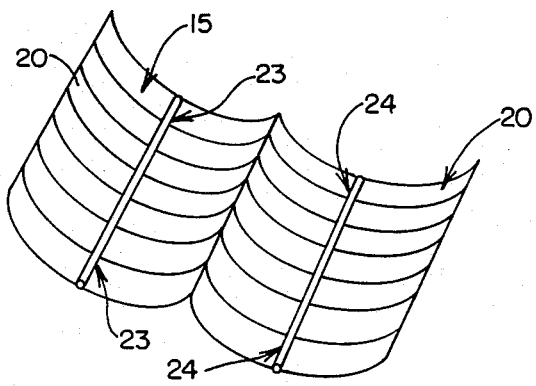
FIG. 3 is a developed view of the interior of the load cell enclosure in FIG. 1.

Referring initially to FIGS. 1 to 3, there is shown a dual beam load cell 10 having strain gages 12 mounted on its upper and lower beam surfaces in a known manner. Load cell 10 has a central longitudinal axis 13. A hermetically sealing enclosure in the form of a conventional bellows 15 encloses the portion of load cell 10 on which strain gages 12 are mounted. Bellows 15 has a neck 17, 18 at respective ends thereof welded to radial flanges 19 on load cell 10. Bellows 15 is provided with a sequence of convolutions 20 throughout its length. In accordance with the present invention, stiffening rods 23, 24 are soldered or otherwise suitably fastened to the radially inner periphery of each of a series of adjacent convolutions to strengthen bellows 15 against torsional deformation.

In use, load cell 10 is fixed rigidly at one end and a load to be measured applied at the other end through a scale platter or similar device (not shown). The applied load causes load cell 10 to flex or bend in a known manner and strain gages 12 to produce an electrical signal indicative of the load applied. The convolutions 20 of the bellows enclosure 15 permit the bellows to flex easily in the direction of load cell bending without affecting such bending.

Loads applied other than vertically through central axis 13 such as indicated by the arrow F in FIG. 2, produce moments which affect the output of strain gages 12 causing the gages to produce different readings when the same weight is placed at different positions on a scale platter. Load cell 10 is compensated to overcome such load position errors by, for example, the method described in Griffen U.S. Pat. No. 4,380,175 as mentioned above.

It has been found that off-center loads such as indicated by the arrow F in FIG. 2 can produce in bellows enclosure 15 torsional stresses and deformation in the form of elastic buckling which produce a force vector at the ends of the bellows. The direction of this force vector is perpendicular to the longitudinal axis of the bellows. This force is transmitted to the load cell and affects the output thereof in a non-linear fashion such that linear load position compensation methods are rendered difficult and/or less effective. Stiffening rods 23, 24 are provided to make bellows 15 torsionally resistant to elastic buckling by attaching together a number of the convolutions. Rods 23, 24 enable the bellows to resist elastic buckling and other torsional deformation under torsional loading and are positioned circumferentially in the bending plane of the load cell so as not to inhibit flexing of the bellows in the vertical direction.

Rods 23, 24 are attached after first aligning all the convolutions of the bellows, then soldering the rods thereto at the selected circumferential locations. Alignment of the convolutions prior to attaching rods 23, 24 thereto assists in causing the various individual bellows to behave uniformly and reduces any predisposition to buckling in a given direction.

While two stiffening rods are shown, a single rod or more than two rods may be used. The rods also may be attached to the outer instead of the inner periphery of the convolutions. Further, while rods are preferred, any means by which a sequence of convolutions can be connected together at one or more circumferential locations on the bellows for the purpose of making it more resistant to torsional deformation is sufficient.

The rods are believed to make the bellows resistant to buckling for two reasons. First, since the convolutions are aligned to be perpendicular to the longitudinal axis of the bellows prior to attaching the rods, that alignment is maintained. Any misalignment of the convolutions could give the convolution faces a predisposed direction in which to buckle, and thus buckling could occur more readily than if the convolutions were aligned. The second reason is that, if at least two rods are used, the free span of each convolution face is shortened and, therefore, the resistance to buckling is increased.

Figure 4:
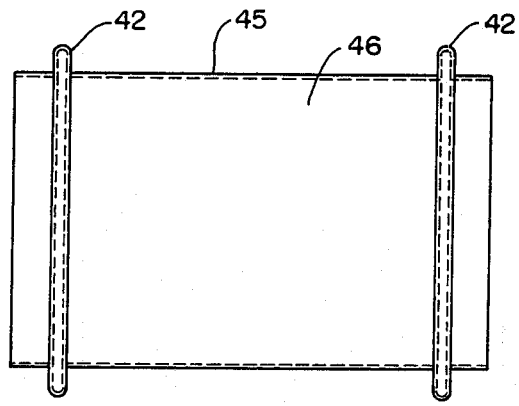
FIG. 4 is a side elevational view of an alternate form of enclosure embodying the present invention.
Figure 5:
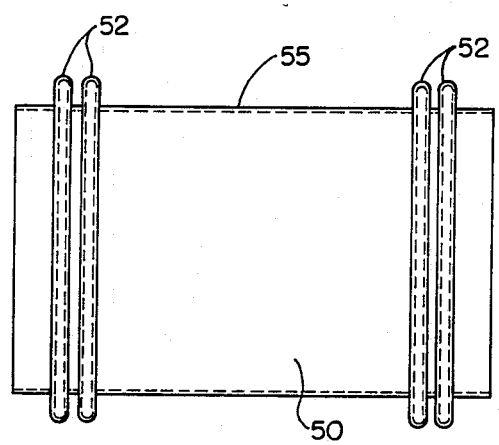
FIG. 5 is a side elevational view of another alternate form of enclosure.

FIGS. 4 and 5 show modified enclosures provided with only one or two convolutions at each end thereof. Enclosure 40 of FIG. 4 has only a single convolution 42 at each end thereof separated by a relatively straight non-convoluted wall portion 45. The absence of convolutions in wall portion 45 makes the enclosure sufficiently torsionally stiff in many cases to prevent torsional elastic buckling while convolutions 42 provide adequate flexibility for the enclosure to bend vertically. Further, wall portion 45 can be made slightly greater in thickness than the wall of convolutions 42 if desired for greater resistance to torsional buckling. Another alternative is to attach stiffener rods similar to rods 23, 24 (FIGS. 1 to 3) to wall 45 at one or more circumferentially spaced locations thereon.

The enclosure 50 of FIG. 5 is similar to enclosure 40 of FIG. 4 but has two convolutions 52 at each end thereof rather than one as in FIG. 4. The additional convolutions provide increased flexibility of the enclosure in the vertical direction. Convolutions 52 are separated by relatively straight non-convoluted wall portion 55 as in the enclosure of FIG. 4. It will be apparent that additional convolutions 52 can be provided if desired and the torsional stiffness of wall 5 modified by increasing its thickness uniformly or by attachment of stiffening rods or members as desired.

While this invention has been described above in connection with a dual beam load cell employing strain gages, it will be appreciated that it is applicable to essentially any load cell having one or more beams and may employ force transducers other than strain gages.

What is claimed is:

1. A load cell comprising at least one beam having a central longitudinal axis, a force transducer mounted on the beam, enclosure means enclosing the portion of said beam bearing the force transducer, said enclosure means having a first end and a second end rigidly attached to said beam, said enclosure means including at least one convolution to render it flexible to loads applied along said longitudinal axis and means rigid relative to said convolution for reducing non-linear torsional deformation of said enclosure means under loads applied transversely to said longitudinal axis.

2. A load cell as claimed in claim 1 wherein said enclosure means includes at least two convolutions and said relatively rigid means connecting said convolutions, whereby said convolutions render said enclosure relatively flexible to loads applied along said longitudinal axis and said rigid connecting means reduces non-linear torsional deformation by loads applied transversely of said longitudinal axis.

3. A load cell as claimed in claim 2 wherein said connecting means includes a relatively straight, non-convoluted wall portion.

4. A load cell as claimed in claim 3 wherein the thickness of said wall portion is greater than that of the wall of said convolutions.

5. A load cell as claimed in claim 2 wherein said connecting means includes a stiffening rod at one or more points on the circumference of said enclosure means.

6. A load cell as claimed in claim 2 wherein said enclosure means includes convolutions throughout its length, and said connecting means includes means rigidly connecting adjacent ones of said convolutions together at a point on the circumference of said enclosure means, whereby said enclosure means is rendered relatively resistant to torsional deformation under loads applied transversely of said longitudinal axis.

7. A load cell as claim in claim 6 wherein said rigid connecting means is positioned in the bending plane of said beam, whereby it does not materially decrease the flexibility of the enclosure means to loads applied along the longitudinal axis of the beam.

8. A load cell as claimed in claim 6 including a second rigid connecting means connecting said convolutions together at a second point on the circumference of said enclosure means spaced diametrically opposite said rigid connecting means.

9. A load cell as claimed in claim 6 wherein said rigid connecting means includes a stiffener rod attached to the periphery of said convolutions.

10. A load cell comprising a beam having a central longitudinal axis, a force transducer mounted on the beam, enclosure means enclosing the portion of said beam bearing the force transducer, said enclosure means having at least one convolution, and means rigid relative to the convolution connected thereto for increasing the resistance to torsional deformation of the enclosure means.

11. A method of hermetically sealing a load cell having at least one beam with a force transducer mounted thereon and having a longitudinal axis, comprising the steps of providing an enclosure to enclose the portion of said beam bearing the force transducer, providing at least one convolution in said enclosure to render it flexible to loads applied along the longitudinal axis of said beam, connecting relatively rigid means to said convolution to reduce the non-linear torsional deformation of said enclosure under loads applied transversely to the longitudinal axis of said beam, and rigidly attaching the ends of said enclosure to said beam.

12. A method as claimed in claim 11 including the step of connecting a relatively rigid, non-convoluted wall portion of said enclosure to said convolution.

13. A method as claimed in claim 11 including the step of providing a plurality of convolutions in said enclosure and rigidly connecting together a sequence of adjacent convolutions.

14. A method as claimed in claim 13 including the step of aligning the convolutions prior to the load cell.

15. A method as claimed in claim 13 including the step of attaching stiffening means to the periphery of each convolution in the sequence to connect them together.

* * * * *